United States Patent
Mataga et al.

(10) Patent No.: US 9,921,097 B2
(45) Date of Patent: Mar. 20, 2018

(54) SENSOR DEVICE, VIBRATION DETECTION SYSTEM, SENSOR UNIT, INFORMATION PROCESSING DEVICE, VIBRATION DETECTION METHOD, AND PROGRAM

(71) Applicant: NEC Corporation, Minato-ku, Tokyo (JP)

(72) Inventors: Junichiro Mataga, Tokyo (JP);
Yasuhiro Sasaki, Tokyo (JP);
Masatake Takahashi, Tokyo (JP);
Shigeki Shinoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 353 days.

(21) Appl. No.: 14/429,849

(22) PCT Filed: Sep. 27, 2013

(86) PCT No.: PCT/JP2013/076210
§ 371 (c)(1),
(2) Date: Mar. 20, 2015

(87) PCT Pub. No.: WO2014/051030
PCT Pub. Date: Apr. 3, 2014

(65) Prior Publication Data
US 2015/0226604 A1    Aug. 13, 2015

(30) Foreign Application Priority Data
Sep. 28, 2012   (JP) .................................. 2012-217512

(51) Int. Cl.
*G01N 11/00* (2006.01)
*G01L 7/00* (2006.01)
(Continued)

(52) U.S. Cl.
CPC .................. *G01H 5/00* (2013.01); *G01H 1/00* (2013.01); *G01H 11/00* (2013.01)

(58) Field of Classification Search
CPC ............. G01H 5/00; G01H 1/00; G01H 11/00
See application file for complete search history.

(56) References Cited

U.S. PATENT DOCUMENTS

| 6,453,247 | B1 * | 9/2002 | Hunaidi ................ G01M 3/243 |
| | | | 702/51 |
| 2003/0053375 | A1 * | 3/2003 | Watanabe ................ H04R 1/44 |
| | | | 367/131 |

(Continued)

FOREIGN PATENT DOCUMENTS

| JP | H09-152372 A | 6/1997 |
| JP | H11-142528 A | 5/1999 |

(Continued)

OTHER PUBLICATIONS

International Search Report for PCT Application No. PCT/JP2013/076210, dated Dec. 17, 2013.

(Continued)

*Primary Examiner* — Toan Le

(57) ABSTRACT

A sensor device includes: a first sensor group (13) in which a plurality of first vibration sensors for detecting vibration acceleration in one direction with respect to an object to be detected are arranged to face the same direction; a phase difference calculation unit (220) which, based on a plurality of first signals indicating the vibration acceleration detected by each of the plurality of first vibration sensors included in the first sensor group (13), calculates a first phase difference indicating the phase difference between the plurality of first signals; and an acceleration calculation unit (230) which, using the first phase difference and the plurality of first signals, calculates vibration acceleration in a first direction perpendicular to a surface on which the plurality of first vibration sensors are arranged, and vibration acceleration in (Continued)

a second direction parallel to the surface on which the plurality of first vibration sensors are arranged.

16 Claims, 11 Drawing Sheets

(51) Int. Cl.
    *G01F 17/00*     (2006.01)
    *G01F 23/00*     (2006.01)
    *G01H 5/00*     (2006.01)
    *G01H 1/00*     (2006.01)
    *G01H 11/00*     (2006.01)

(56) References Cited

U.S. PATENT DOCUMENTS

| | | | | |
|---|---|---|---|---|
| 2004/0153270 | A1* | 8/2004 | Yamashita | G01N 33/383 702/81 |
| 2008/0314122 | A1* | 12/2008 | Hunaidi | G01M 3/243 73/40.5 A |
| 2010/0141435 | A1* | 6/2010 | Breed | G06Q 10/06 340/539.13 |
| 2012/0007743 | A1* | 1/2012 | Solomon | G01M 3/243 340/605 |
| 2015/0236610 | A1* | 8/2015 | Sasaki | H02M 7/06 73/649 |
| 2015/0276545 | A1* | 10/2015 | Takahashi | G01M 3/243 73/592 |

FOREIGN PATENT DOCUMENTS

| | | |
|---|---|---|
| JP | H11-190777 A | 7/1999 |
| JP | 2000-298137 A | 10/2000 |
| JP | 2004-132821 A | 4/2004 |
| JP | 2009-007859 A | 1/2009 |
| JP | 2010-156704 A | 7/2010 |

OTHER PUBLICATIONS

Extended European Search Report for EP Application No. EP13841307.5 dated Apr. 22, 2016.

* cited by examiner

Fig. 2
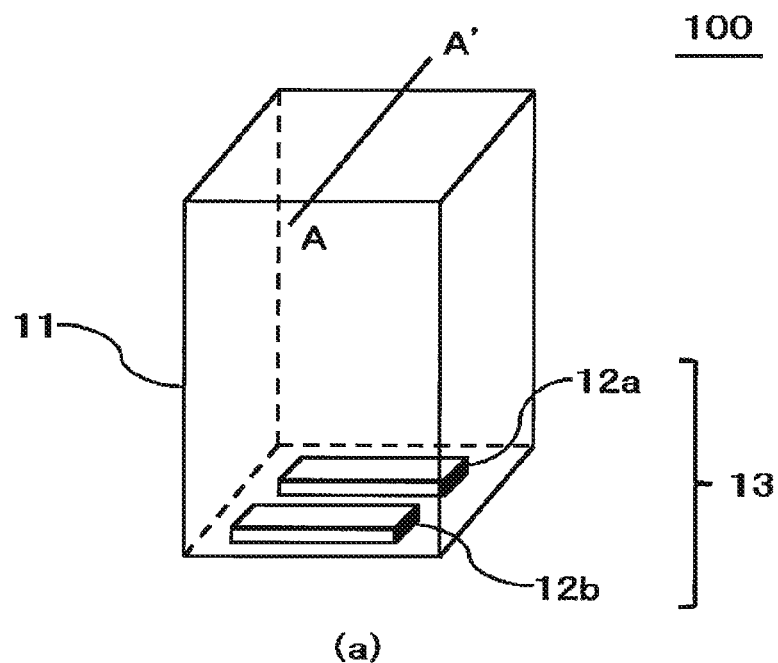
(a)
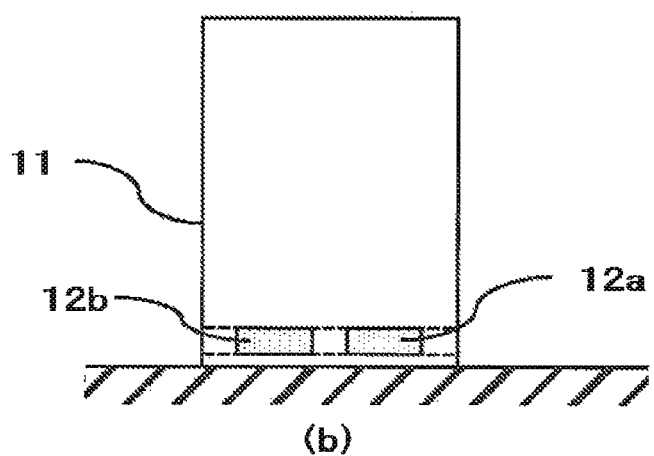
(b)

Fig. 4
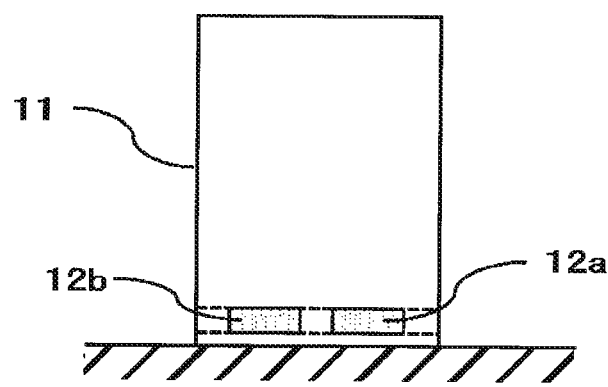
(a)
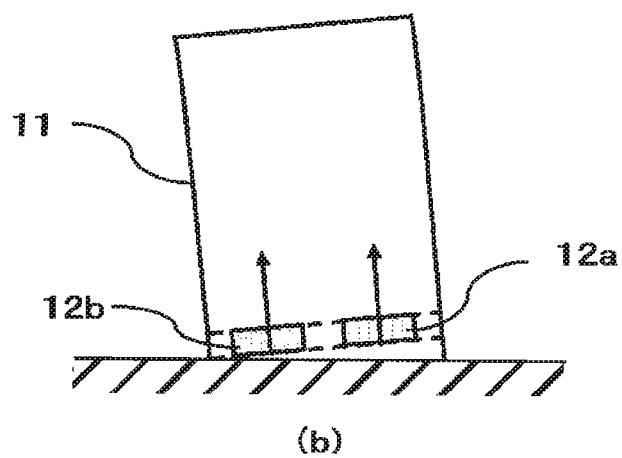
(b)

(a) SENSOR OUTPUT WAVEFORM (b) FREQUENCY SPECTRUM (a)

(b)

SENSOR DEVICE, VIBRATION DETECTION SYSTEM, SENSOR UNIT, INFORMATION PROCESSING DEVICE, VIBRATION DETECTION METHOD, AND PROGRAM

This application is a National Stage Entry of PCT/JP2013/076210 filed on Sep. 27, 2013, which claims priority from Japanese Patent Application 2012-217512 filed on Sep. 28, 2012, the contents of all of which are incorporated herein by reference, in their entirety.

TECHNICAL FIELD

The present invention relates to a sensor device, a vibration detection system, a sensor unit, an information processing device, a vibration detection method, and a program for detecting vibration from an object to be detected.

BACKGROUND ART

In recent years, it has been frequently seen that old buildings, or machines and electronic devices degraded with time fail. Many of these degradation failures occur due to mechanical wear or cracks generated by long-time use. Such wear degradation or cracks generate unnecessary vibration. Thus, in order to predict and prevent grave accidents caused by degradation or failures, a sensor for detecting vibration generated due to wear degradation or cracks is used in many cases.

Vibrations generated from an object to be detected of water piping which is a vibration source or the like include not only vibration in a direction perpendicular to a front surface of the object to be detected but also vibrations in various directions. Thus, to predict and prevent degradation, detecting vibrations in various directions is needed. For example, as a technology for detecting vibration accelerations in three axial directions, there is developed a technology using a piezoelectric acceleration sensor as described in Patent Literature 1 (PTL1) or an acceleration sensor using MEMS (Micro Electro Mechanical Systems) as described in Patent Literature 2 (PTL2).

Patent Literature 3 (PTL3) discloses a method for detecting external forces in X and Y axis directions orthogonal to a detecting direction (Z axis) based on detection outputs different from one another in phase and detected by three vibration sensors each for detecting vibration acceleration in one axial direction.

CITATION LIST

Patent Literature

[PTL 1] Japanese Laid-open Patent Publication No. 2000-298137
[PTL 2] Japanese Laid-open Patent Publication No. 2010-156704
[PTL 3] Japanese Laid-open Patent Publication No. Hei 09-152372

SUMMARY OF THE INVENTION

Technical Problem

However, the acceleration sensor for the three axial directions as described in the Patent Literature 1 or 2 (PTL1 or PTL2) is generally expensive, and increases manufacturing costs of a sensor unit. This increases overall costs of a system using the sensor unit. In the Patent Literature 3 (PTL3), the inexpensive vibration sensor of the one axial direction is used. However, at least three vibration sensors are necessary. For this reason, in the Patent Literature 3 (PTL3), there is room for cutting costs.

It is therefore an object of the present invention to provide a sensor device, a vibration detection system, a sensor unit, an information processing device, a vibration detection method, and a program capable of inexpensively detecting vibrations in a plurality of axial directions.

Solution to Problem

According to the present invention, there is provided a sensor device including:
a first sensor group in which a plurality of first vibration sensors for detecting vibration acceleration in one direction with respect to an object to be detected are arranged to face the same direction;
a phase difference calculation unit which, based on a plurality of first signals indicating the vibration acceleration detected by each of the plurality of first vibration sensors included in the first sensor group, calculates a first phase difference indicating a phase difference between the plurality of first signals; and
an acceleration calculation unit which, using the first phase difference and the plurality of first signals, calculates vibration acceleration in a first direction perpendicular to a surface on which the plurality of first vibration sensors are arranged, and vibration acceleration in a second direction parallel to the surface.

According to the present invention, there is provided a vibration detection system including:
a sensor unit including a first sensor group in which a plurality of first vibration sensors for detecting vibration acceleration in one direction with respect to an object to be detected are arranged to face the same direction; and
an information processing device, wherein:
the sensor unit includes a transmission unit which transmits a plurality of first signals indicating the vibration acceleration detected by each of the plurality of first vibration sensors included in the first sensor group; and
the information processing device includes:
a reception unit which receives the plurality of first signals;
a phase difference calculation unit which, based on the plurality of first signals, calculates a first phase difference indicating a phase difference between the plurality of first signals; and
an acceleration calculation unit which, using the first phase difference and the plurality of first signals, calculates vibration acceleration in a first direction perpendicular to a surface on which the plurality of first vibration sensors are arranged, and vibration acceleration in a second direction parallel to the surface.

According to the present invention, there is provided a sensor unit including:
a first sensor group in which a plurality of first vibration sensors for detecting vibration acceleration in one direction with respect to an object to be detected are arranged to face the same direction; and
a transmission unit which transmits a plurality of first signals indicating the vibration acceleration detected by each of the plurality of first vibration sensors included in the first sensor group to the outside.

According to the present invention, there is provided an information processing device which communicates with a sensor unit including a first sensor group in which a plurality of first vibration sensors for detecting vibration acceleration in one direction with respect to an object to be detected are arranged to face the same direction, the information processing device including:

a reception unit which receives a plurality of first signals indicating the vibration acceleration detected by each of the plurality of first vibration sensors included in the first sensor group;

a phase difference calculation unit which, based on the plurality of first signals, calculates a first phase difference indicating a phase difference between the plurality of first signals; and an acceleration calculation unit which, using the first phase difference and the plurality of first signals, calculates vibration acceleration in a first direction perpendicular to a surface on which the plurality of first vibration sensors are arranged, and vibration acceleration in a second direction parallel to the surface.

According to the present invention, there is provided a vibration detection method including:

by a sensor device including a first sensor group in which a plurality of first vibration sensors for detecting vibration acceleration in one direction with respect to an object to be detected are arranged to face the same direction, calculating, based on a plurality of first signals indicating the vibration acceleration detected by each of the plurality of first vibration sensors included in the first sensor group, a first phase difference indicating a phase difference between the plurality of first signals; and calculating, using the first phase difference and the plurality of first signals, vibration acceleration in a first direction perpendicular to a surface on which the plurality of first vibration sensors are arranged, and vibration acceleration in a second direction parallel to the surface.

According to the present invention, there is provided a vibration detection method achieved by a sensor unit including a first sensor group in which a plurality of first vibration sensors for detecting vibration acceleration in one direction with respect to an object to be detected are arranged to face the same direction, and an information processing device, the method including:

by the sensor unit, transmitting a plurality of first signals indicating the vibration acceleration detected by each of the plurality of first vibration sensors included in the first sensor group; and by the information processing device, receiving the plurality of first signals;

calculating, based on the plurality of first signals, a first phase difference indicating a phase difference between the plurality of first signals; and calculating, using the first phase difference and the plurality of first signals, vibration acceleration in a first direction perpendicular to a surface on which the plurality of first vibration sensors are arranged, and vibration acceleration in a second direction parallel to the surface.

According to the present invention, there is provided a program for causing a sensor device including a first sensor group in which a plurality of first vibration sensors for detecting vibration acceleration in one direction with respect to an object to be detected are arranged to face the same direction to achieve:

a phase difference calculation function of calculating, based on a plurality of first signals indicating the vibration acceleration detected by each of the plurality of first vibration sensors included in the first sensor group, a first phase difference indicating a phase difference between the plurality of first signals; and an acceleration calculation function of calculating, using the first phase difference and the plurality of first signals, vibration acceleration in a first direction perpendicular to a surface on which the plurality of first vibration sensors are arranged, and vibration acceleration in a second direction parallel to the surface.

According to the present invention, there is provided a program for operating an information processing device which communicates with a sensor unit including a first sensor group in which a plurality of first vibration sensors for detecting vibration acceleration in one direction with respect to an object to be detected are arranged to face the same direction, the program causing the information processing device to achieve:

a reception function of receiving a plurality of first signals indicating the vibration acceleration detected by each of the plurality of first vibration sensors included in the first sensor group;

a phase difference calculation function of calculating, based on the plurality of first signals, a first phase difference indicating a phase difference between the plurality of first signals; and an acceleration calculation function of calculating, using the first phase difference and the plurality of first signals, vibration acceleration in a first direction perpendicular to a surface on which the plurality of first vibration sensors are arranged, and vibration acceleration in a second direction parallel to the surface.

Advantageous Effects of Invention

The present invention provides the sensor device, the vibration detection system, the sensor unit, the information processing device, the vibration detection method, and the program capable of inexpensively detecting vibrations in a plurality of axial directions.

BRIEF DESCRIPTION OF DRAWINGS

The above and other objects, features and advantages of the present invention will become more apparent from the following description of the preferred exemplary embodiments of the invention in conjunction with the following accompanying drawings.

FIG. 2 is a diagram illustrating a device configuration example of a sensor unit according to the first exemplary embodiment.

FIG. 4 is a diagram illustrating a vibration detection flow of the sensor unit.

DESCRIPTION OF EMBODIMENTS

Hereinafter, the exemplary embodiments of the present invention will be described with reference to the drawings. Throughout the drawings, substantially the same components are denoted by the same or similar reference signs, and description thereof will be omitted when allowed.

First Exemplary Embodiment

Figure 1:
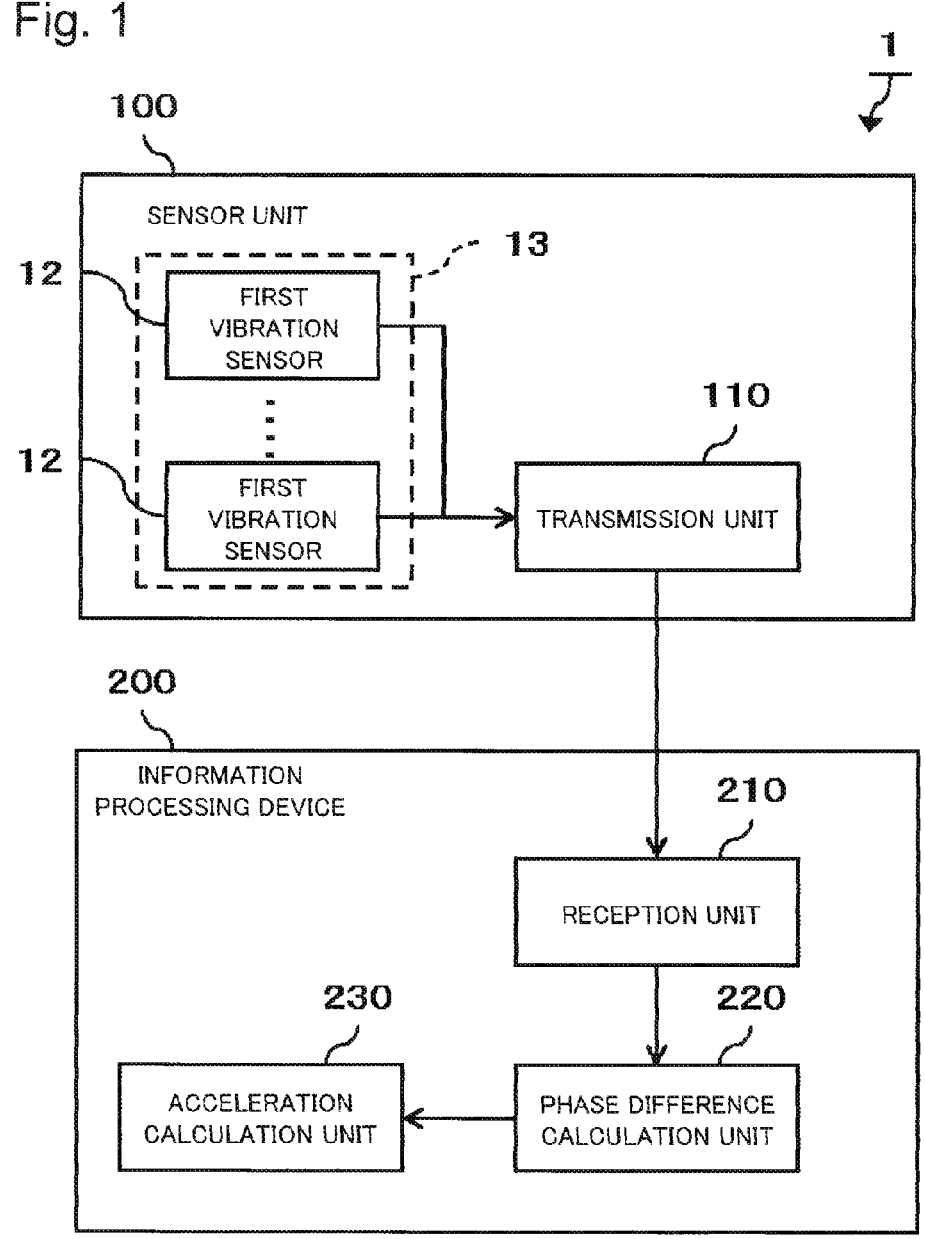
FIG. 1 is a diagram illustrating a configuration example of a vibration detection system according to a first exemplary embodiment.

FIG. 1 is a diagram illustrating a configuration example of a vibration detection system 1 according to a first exemplary embodiment. The vibration detection system 1 includes a sensor unit 100 and an information processing device 200.

The sensor unit 100 includes a plurality of first vibration sensors 12 included in a first sensor group 13, and a transmission unit 110. The plurality of first vibration sensors 12 included in the first sensor group 13 detects vibration acceleration of vibration in given one direction (detecting direction) generated from an object to be detected in which the sensor unit is installed, and converts the vibration acceleration into an electric signal. The transmission unit 110 acquires each signal (first signal) generated for each of the first vibration sensors 12 included in the first sensor group 13, and transmits the signal to the information processing device 200 by wireless communication or wire communication.

FIG. 2 is a diagram illustrating a device configuration example of the sensor unit 100 according to the first exemplary embodiment. FIG. 2(a) is a perspective view of the sensor unit 100, and FIG. 2(b) is a sectional view along with surface A-A' of the sensor unit 100. The sensor unit 100 includes a unit casing 11, and first vibration sensors 12a and 12b. The first vibration sensors 12a and 12b are arranged in parallel as a first sensor group 13 to face the same direction. In the present exemplary embodiment, the first sensor group 13 includes two first vibration sensors 12. However, three or more first vibration sensors 12 may be included. In such a case, the first vibration sensors 12 are similarly arranged in parallel to face the same direction.

According to the present exemplary embodiment, the first vibration sensors 12a and 12b detect vibration of the unit casing 11 in a vertical direction. As the first vibration sensors 12a and 12b, though there are no particular restrictions, for example, a piezoelectric vibration sensor using a polarization change caused by bending of piezoelectric ceramics can be employed. In such a piezoelectric vibration sensor, one end of the piezoelectric ceramics is secured to a support, while the other end is an open end. A voltage is generated when the open end side of the piezoelectric ceramics vibrates, and a signal indicating the vibration acceleration is generated. For structures of the first vibration sensors 12a and 12b, though there are no particular restrictions, a unimorph type in which piezoelectric ceramics is bonded to one surface of a metallic shim material, a bimorph type in which piezoelectric ceramics is bonded to both surfaces of the metallic shim material, or a structure sandwiching a polymer film between the metallic shim material and a peripheral fixed ring to enlarge vibration may be employed. The first vibration sensors 12a and 12b are preferably arranged with a space from each other as much as possible to increase a difference between signals generated at the first vibration sensors 12a and 12b.

The sensor unit 100 is installed in an object to be detected which is a vibration source, such as water piping. As an installing method of the sensor unit 100, a method for installing the sensor unit 100 at a metal part of the object to be detected by a magnet (not illustrated) fitted to a bottom surface of the sensor unit 100 may be used. However, the method is not limited to this. As the installing method of the sensor unit 100, any method such as a bonding method using a polymer adhesive material or the like may be used as long as the method does not suppress vibration from the object to be detected.

The information processing device 200 includes a reception unit 210, a phase difference calculation unit 220, and an acceleration calculation unit 230. The reception unit 210 receives a plurality of first signals transmitted from the transmission unit 110 of the sensor unit 100. The phase difference calculation unit 220 calculates, based on a difference between the plurality of first signals, a first phase difference indicating a phase difference between the plurality of first signals. When the first sensor group 13 includes three or more first vibration sensors 12, for example, the phase difference calculation unit 220 calculates a phase difference between first signals detected by the first vibration sensors 12 adjacent to each other, and acquires an average value or an intermediate value thereof to calculate a first phase difference. The acceleration calculation unit 230 calculates, based on the first phase difference and the plurality of first signals, vibration acceleration in a first direction and vibration acceleration in a second direction. The first direction is a direction perpendicular to a surface on which the plurality of first vibration sensors are arranged. The sensor unit 100 is installed in the object to be detected so that, for example, the first direction can be perpendicular to a propagating direction of vibration in the object to be detected. The second direction is a direction parallel to the surface on which the plurality of first vibration sensors 12 are arranged. The sensor unit 100 is installed in the object to be detected so that, for example, the second direction can be parallel to the propagating direction of the vibration in the object to be detected.

The components of the sensor unit 100 and the information processing device 200 illustrated in each diagram indicate not hardware unit components but functional unit blocks. The components of the sensor unit 100 and the information processing device 200 are achieved by an arbitrary combination of hardware and software mainly including a CPU and a memory of an arbitrary computer, a program for achieving the illustrated components loaded to the memory, a storage medium such as a hard disk for storing the program, and a network connection interface. There are various modification examples of the achieving method and the device.

Figure 3:
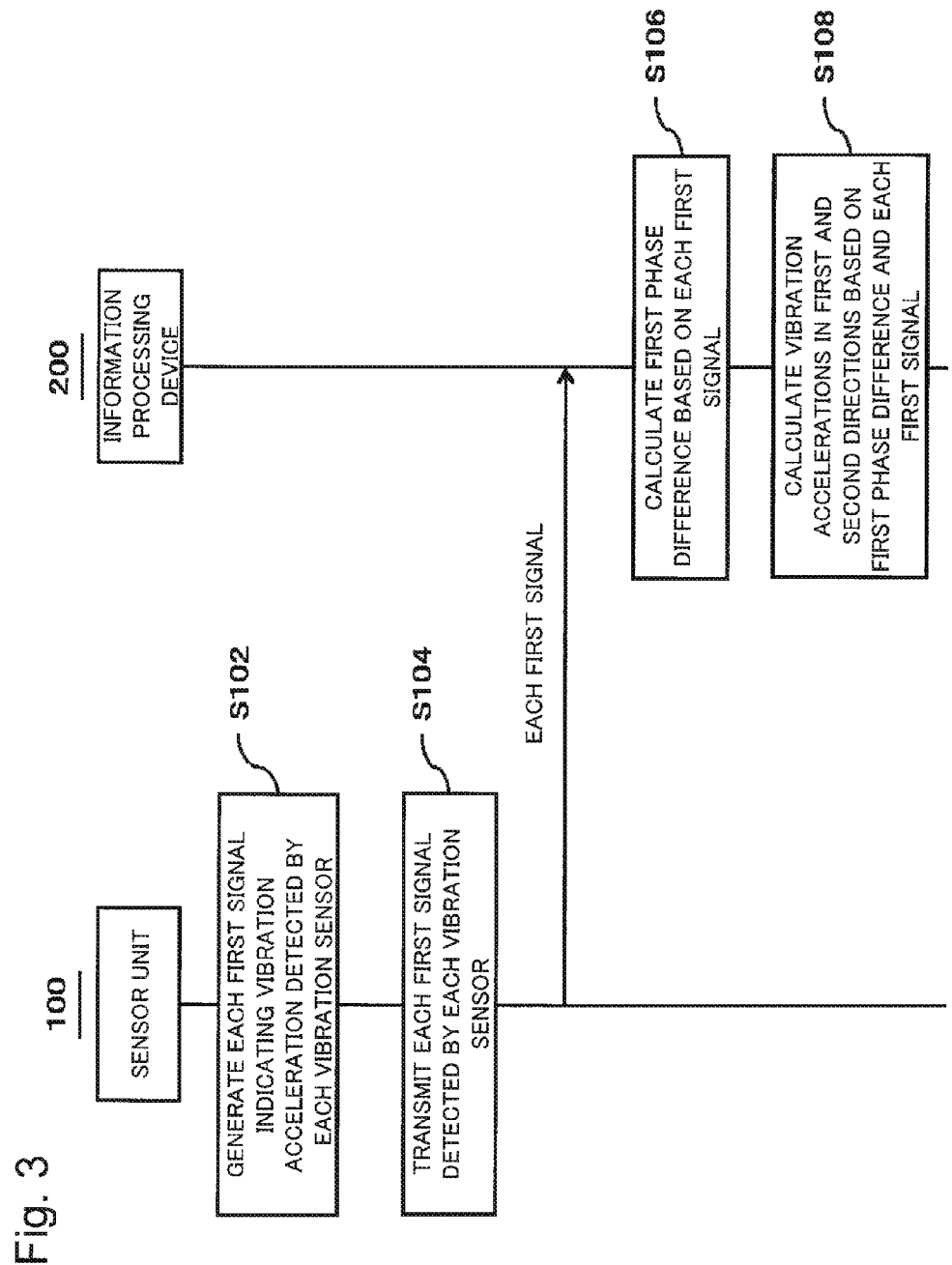
FIG. 3 is a sequential diagram illustrating a processing flow of the vibration detection system according to the first exemplary embodiment.

FIG. 3 is a sequential diagram illustrating a processing flow of the vibration detection system 1 according to the first exemplary embodiment.

The sensor unit 100 generates first signals indicating the vibration acceleration of vibration detected by each of the first vibration sensors 12a and 12b included in the first sensor group (step S102).

A flow of detecting vibration by the sensor unit 100 will be described referring to FIG. 4. FIG. 4(a) is a sectional view of the sensor unit 100, and FIG. 4(b) is a sectional view of the sensor unit 100 when vibration occurs in the object to be detected.

Figure 5:
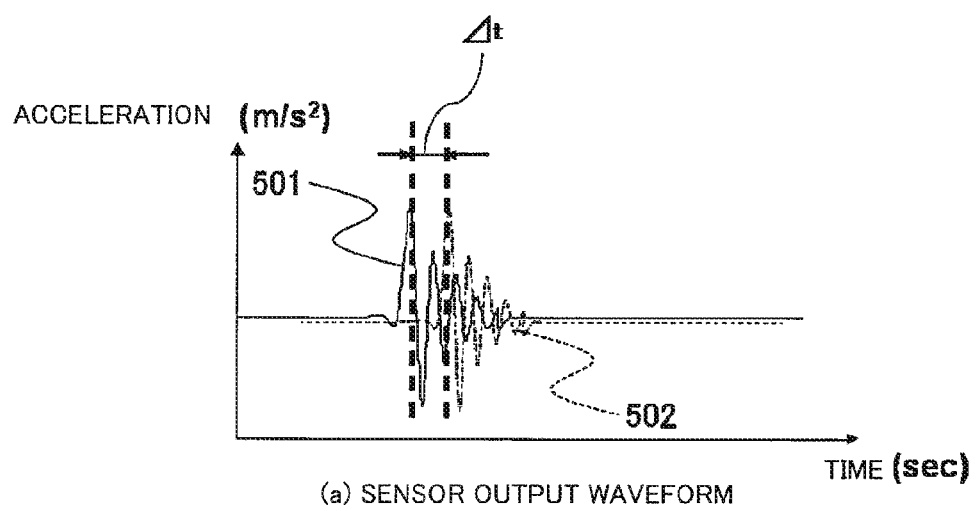
FIG. 5 is a graph illustrating an example of vibration acceleration detected by a first vibration sensor.

When vibration occurs in the object to be detected, since rigidity of the bottom surface of the sensor unit 100 is extremely high, the entire sensor unit 100 is accompanied by rotation as in the case of the unit casing 11 illustrated in FIG. 4(b). In this case, the first vibration sensors 12a and 12b detect vibrations in arrow directions illustrated in FIG. 4(b). Since vibration propagated to the object to be detected such as water piping includes horizontal vibration acceleration of the unit casing 11 in addition to perpendicular vibration acceleration of the unit casing 11, a time lag is generated between signals generated at the first vibration sensors 12a and 12b provided therein. FIG. 5 is a graph illustrating an example of vibration acceleration detected by the first vibration sensors 12a and 12b. In the example illustrated in FIG. 5, a waveform indicated by a solid line represents a first signal 501 indicating the vibration acceleration detected by the first vibration sensor 12a, and a waveform indicated by a dotted line represents a first signal 502 indicating the vibration acceleration detected by the first vibration sensor 12a.

The sensor unit 100 amplifies the first signals respectively generated by the first vibration sensors 12a and 12b by a signal amplification circuit not illustrated, and transmits the amplified signals to the information processing device 200 (step S104). Each first signal is preferably amplified before a phase difference is calculated, and the information processing device 200 may include a signal amplification circuit and amplify each first signal.

Figure 6:
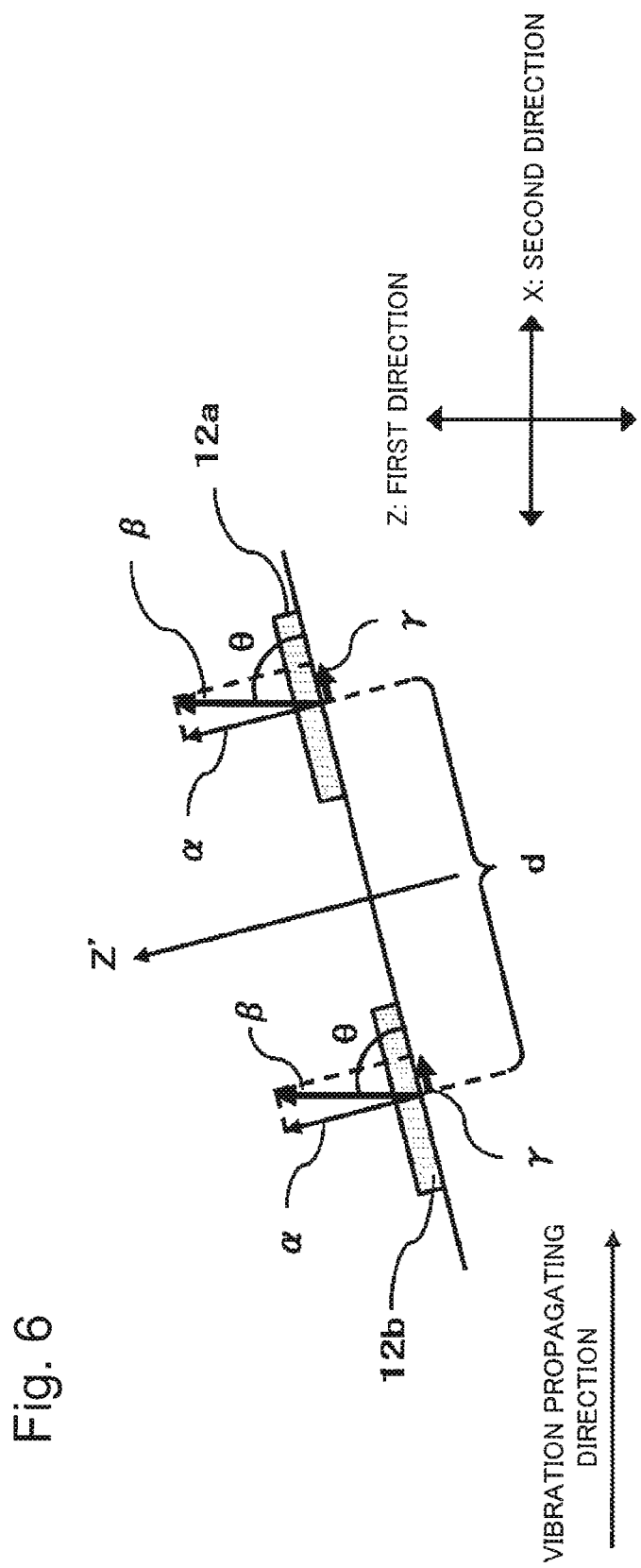
FIG. 6 is a diagram illustrating an example of calculating vibration acceleration in a first direction and vibration acceleration in a second direction based on a first phase difference and each signal included in a first signal group.

The information processing device 200 calculates, based on the received first signals, a first phase difference indicating a phase difference between the first signals (step S106). Specifically, the information processing device 200 can calculate a propagating speed v of vibration with respect to the object to be detected based on the signals generated by the first vibration sensors 12a and 12b. Then, the information processing device 200 can calculate, based on the propagating speed v of vibration and a time difference Δt between the first signals generated by the first vibration sensors 12a and 12b, a distance L of a wave horizontally propagated during the time difference Δt. The information processing device 200 calculates a phase difference (first phase difference) based on the distance L and a distance d between the first vibration sensors 12a and 12b as illustrated in FIG. 6. The time difference Δt can be calculated based on a difference in time of taking maximum values between the signals, for example, as illustrated in FIG. 5. The phase difference is calculated based on the following Formula 1.

[Equation 1]

$$\theta = \cos^{-1}\left(\frac{L}{d}\right) \quad \text{(Formula 1)}$$

The information processing device 200 calculates, based on the first phase difference calculated in step S106 and the first signals, vibration acceleration in the first direction and vibration acceleration in the second direction (step S108). FIG. 6 is a diagram illustrating an example of calculating vibration acceleration in the first direction and vibration acceleration in the second direction based on the first phase difference and the first signals. FIG. 6 illustrates an inclined state of the unit casing 11 caused by vibration from the object to be detected. This is an instantaneous illustration of the state of the sensor unit 100 to which the vibration is propagated. Accordingly, in FIG. 6, the first direction is a Z direction which is a perpendicular direction on a paper surface, while the second direction is an X direction which is a horizontal direction on the paper surface. In FIG. 6, a vibration detection direction of the first vibration sensors 12a and 12b when the unit casing 11 inclines is indicated by Z'.

In FIG. 6, the vibration acceleration detected by the first vibration sensors 12a and 12b is indicated by an arrow α. A relationship between the vibration acceleration α and vibration acceleration β in the first direction and vibration acceleration γ in the second direction separated from the vibration acceleration α is represented by the following Formula 2 and Formula 3. In the equations, θ denotes the first phase difference calculated in step S106.

[Equation 2]

$$\beta = \frac{\alpha}{\sin\theta} \quad \text{(Formula 2)}$$

$$\gamma = \frac{\alpha}{\tan\theta} \quad \text{(Formula 3)}$$

Figure 7:
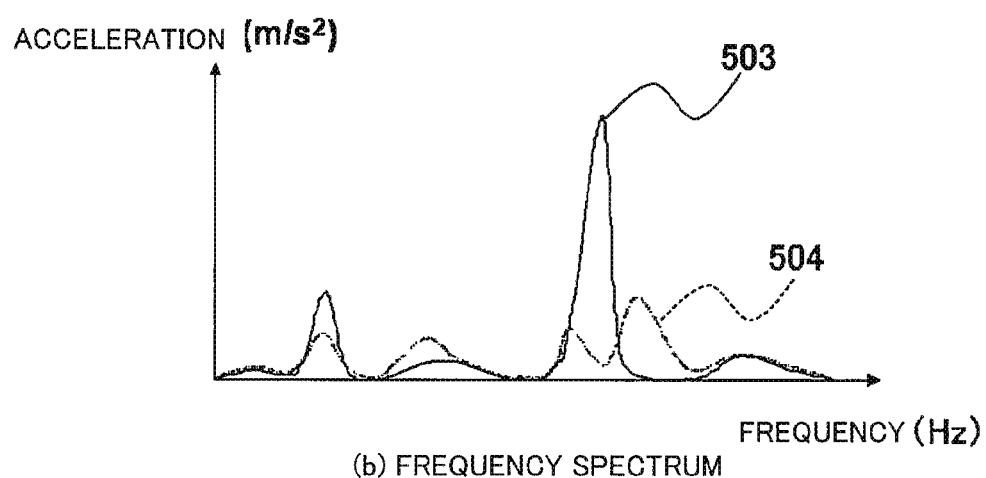
FIG. 7 is a graph illustrating an acceleration spectrum distribution of the vibration acceleration in each of the first and second directions acquired based on each signal illustrated in FIG. 5.

From the vibration acceleration β in the first direction and the vibration acceleration γ in the second direction separated by using the relationship represented by the equations (2) and (3), acceleration spectrum 503 in the first direction and acceleration spectrum 504 in the second direction as illustrated in FIG. 7 can be acquired. The acceleration spectrum 503 in the first direction and the acceleration spectrum 504 in the second direction can be acquired by Fourier-transforming time waveforms indicated by the vibration acceleration β in the first direction and the vibration acceleration γ in the second direction into respective frequencies.

Thus, according to the present exemplary embodiment, the first vibration sensors 12a and 12b arranged in parallel to face the same direction so as to detect vibrations in the same direction generate first signals indicating the vibration acceleration detected from the object to be detected. Then, the first signals generated by the first vibration sensors 12a and 12b are transmitted to the information processing device 200. The phase difference (first phase difference) is calculated based on the difference between the first signals received by the information processing device 200. Then, based on the first phase difference and the first signals, the vibration acceleration in the first direction and the vibration acceleration in the second direction are calculated. Thus, by using the inexpensive vibration sensor of the one axial direction, vibrations in the two axial directions can be detected, and costs of the sensor unit which detects degradation of the object to be detected by the vibration can be reduced. As a result, costs of the vibration detection system can be reduced.

By installing the piezoelectric vibration sensor as illustrated in FIG. 2, a height of the unit casing 11 can be suppressed to be shorter than that in the case of longitudinally installing the vibration sensor as in the Patent Literature 3 (PTL3), and the sensor unit 100 can be manufactured more compact.

The present exemplary embodiment has been described by way of example where the vibration detection system 1 includes the sensor unit 100 and the information processing device 200 as separate devices. However, the vibration detection system 1 may be configured by including one device (sensor device) including each processing unit illustrated in FIG. 1. In this case, the same effects as those of the vibration detection system 1 described above can be provided.

Figure 8:
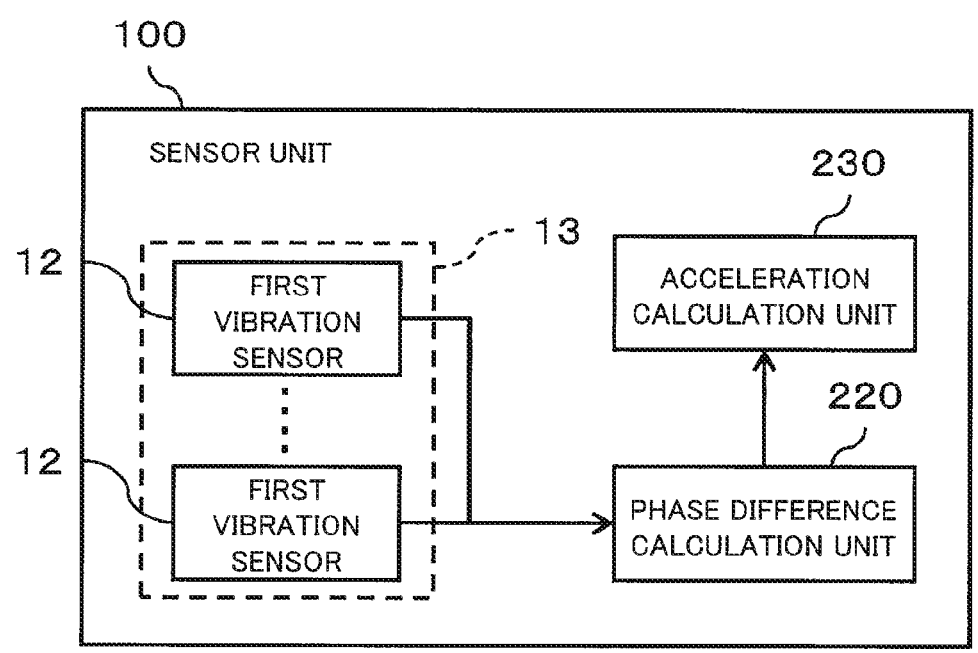
FIG. 8 is a diagram illustrating another configuration example of the sensor unit according to the first exemplary embodiment.

According to the exemplary embodiment, for example, as illustrated in FIG. 8, the sensor unit 100 may include each processing unit of the information processing device 200. Thus, without transmitting any of the plurality of first signals to the information processing device 200 via the transmission unit 102, the same effects as those of the vibration detection system 1 can be provided only by the sensor unit 100.

Second Exemplary Embodiment

The present exemplary embodiment is similar to the first exemplary embodiment except for the following points.

Figure 9:
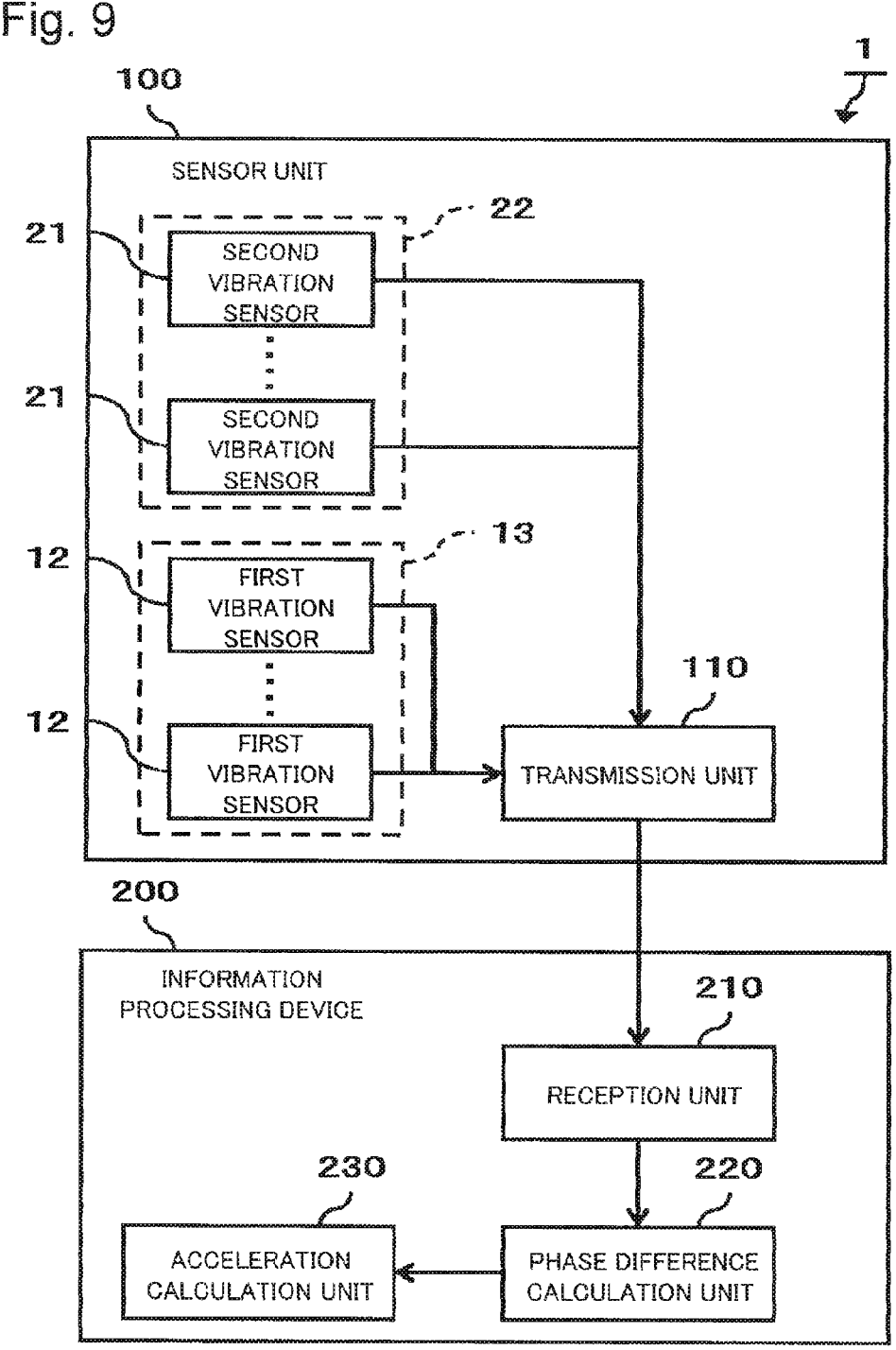
FIG. 9 is a diagram illustrating a configuration example of a vibration detection system according to a second exemplary embodiment.

FIG. 9 is a diagram illustrating a configuration example of a vibration detection system 1 according to the second exemplary embodiment. A sensor unit 100 according to the present exemplary embodiment further includes a plurality of second vibration sensors 21 included in a second sensor group 22. A transmission unit 110 further acquires a plurality of second signals indicating the vibration acceleration detected by each of the plurality of second vibration sensors included in the second sensor group, and transmits the second signals to an information processing device 200.

A reception unit 210 further receives the plurality of second signals generated for each of the second vibration sensors 21 included in the second sensor group 22. A phase difference calculation unit 220 calculates, based on the plurality of second signals, a second phase difference indicating a phase difference between the plurality of second signals. An acceleration calculation unit 230 calculates, based on the second phase difference and the second signals, vibration acceleration in a first direction and vibration acceleration in a third direction different from first and second directions.

Figure 10:
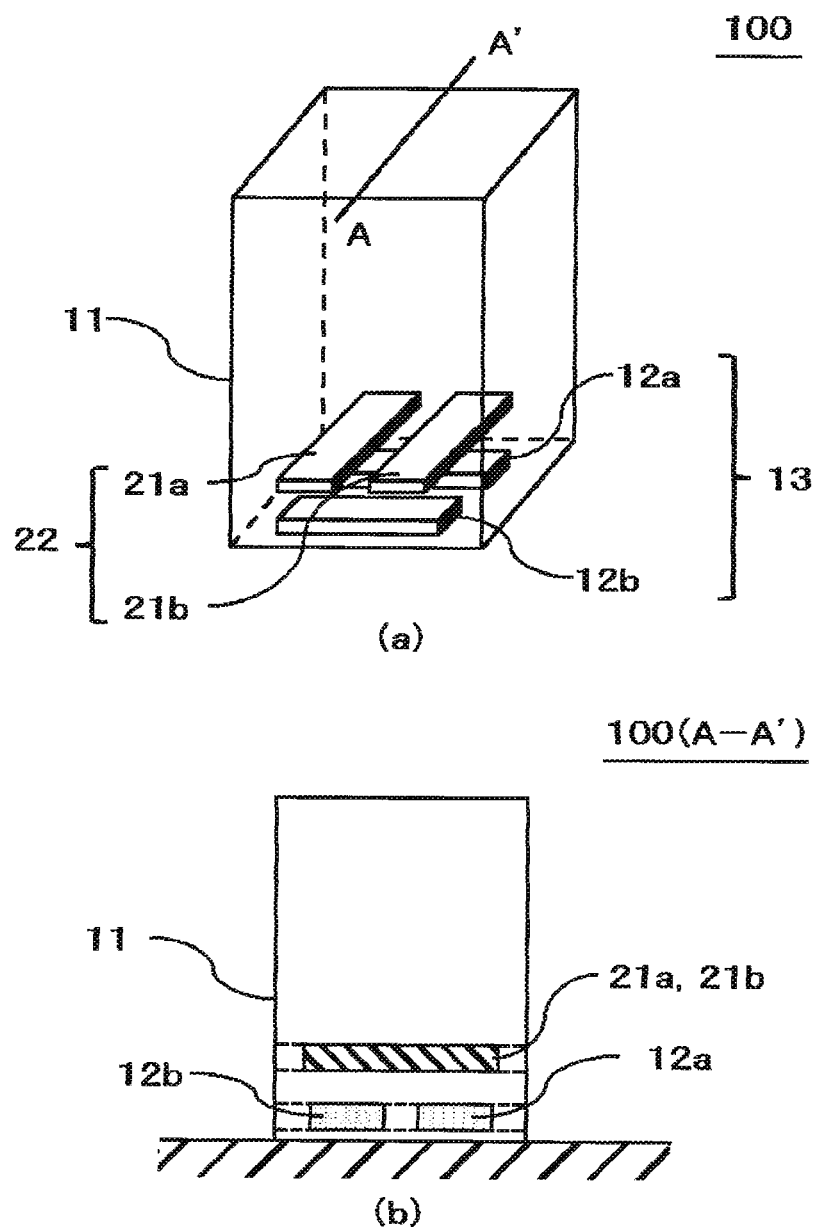
FIG. 10 is a diagram illustrating a device configuration example of a sensor unit according to the second exemplary embodiment.

FIG. 10 is a diagram illustrating a device configuration example of the sensor unit 100 according to the second exemplary embodiment. FIG. 10(a) is a perspective view of the sensor unit 100, and FIG. 10(b) is a sectional view along with surface A-A' of the sensor unit 100. The sensor unit 100 according to the present exemplary embodiment includes, in addition to those of the first exemplary embodiment, second vibration sensors 21a and 21b as a second sensor group 22. The second vibration sensors 21a and 21b are arranged to face the same direction each other as that of first vibration sensors 12a and 12b included in a first sensor group 13. The second vibration sensors 21a and 21b are arranged side by side in a direction different from a direction in which the first vibration sensors 12a and 12b are arranged when a surface on which the first vibration sensors 12a and 12b are arranged is seen from a perpendicular direction. Accordingly, the acceleration calculation unit 230 can calculate vibration acceleration in the third direction as in the case of the first sensor group 13. The second sensor group 22 according to the present exemplary embodiment includes two second vibration sensors 21. However, three or more second vibration sensors 21 may be included. In such a case, the second vibration sensors 21 are similarly arranged in parallel to face the same direction. FIG. 10 illustrates an example where the first vibration sensors 12a and 12b and the second vibration sensors 21a and 21b are disposed one over the other. However, a positional relationship between the first vibration sensors 12a and 12b and the second vibration sensors 21a and 21b is not limited to the example. For example, the first vibration sensors 12a and 12b and the second vibration sensors 21a and 21b may be arranged on the same plane.

In the present exemplary embodiment, the second sensor group 22 is disposed by changing a direction of the first sensor group 13. A processing flow concerning the second sensor group 22 is similar to that of the first exemplary embodiment, and thus description thereof will be omitted. According to the present exemplary embodiment, the information processing device 200 receives the plurality of second signals indicating the vibration acceleration detected by each of the second vibration sensors 21a and 21b included in the second sensor group 22. Then, the information processing device 200 calculates a phase difference (second phase difference) based on a difference between the second signals. By substituting the calculated second phase difference for θ of the Formula 2, vibration acceleration in the third direction can be further calculated. In the example illustrated in FIG. 10, when a surface on which the first vibration sensors 12a and 12b are arranged is seen from the perpendicular direction, a direction in which the first vibration sensors 12a and 12b are arranged and a direction in which the second vibration sensors 21a and 21b are arranged are orthogonal to each other. In this case, the calculated first, second, and third directions are orthogonal to one another.

Thus, according to the present exemplary embodiment, in addition to the vibration accelerations in the first and second directions, the vibration acceleration in the third direction can be further calculated. As a result, a vibration detection system capable of detecting vibrations in three axial directions by using an inexpensive vibration sensor of a one axial direction even without using any expensive triaxial sensor can be constructed.

By installing a piezoelectric vibration sensor as illustrated in FIG. 10, a height of the unit casing 11 can be suppressed to be shorter than that in the case of longitudinally installing the vibration sensor as in the Patent Literature 3 (PTL3), and the sensor unit 100 can be manufactured more compact.

According to the present exemplary embodiment, as described in the first exemplary embodiment, one sensor device including both the sensor unit 100 and the information processing device 200 can provide the same effects as those described above. As described in the first exemplary embodiment, when the sensor unit 100 includes each processing unit of the information processing device 200, the above-mentioned effects can be provided only by the sensor unit 100.

The exemplary embodiments of the present invention have been described with reference to the drawings. However, these are only examples of the present invention, and various configurations other than those above can be employed. For example, for convenience, in each exemplary embodiment, the configuration example where the numbers of the sensor unit 100 or the information processing device 200 are respectively one has been described. However, a configuration including a plurality of sensor units 100 or information processing devices 200 may be employed.

Figure 11:
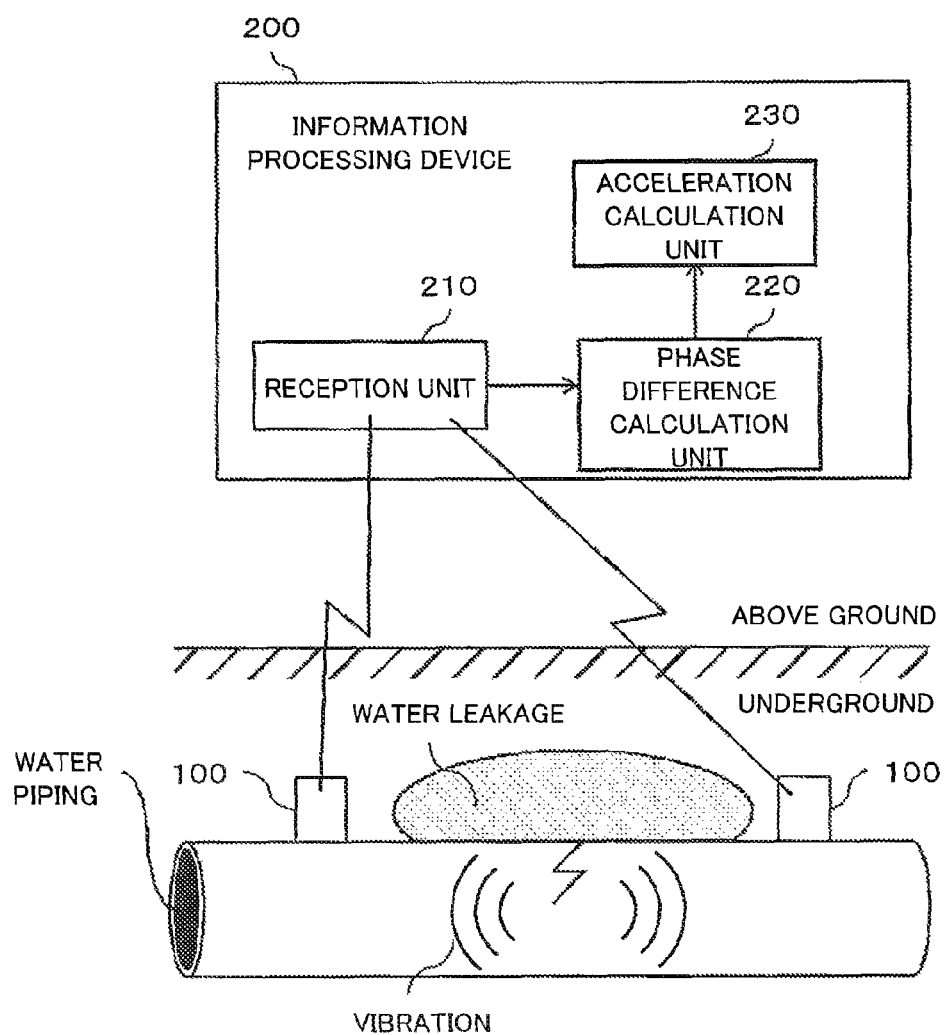
FIG. 11 is a diagram illustrating an example of a water leakage detection system using the sensor unit and an information processing device according to the present invention.

The sensor unit 100 according to each of the above exemplary embodiments can be installed in water piping to be used, for example, as illustrated in FIG. 11. FIG. 11 is a diagram illustrating an example of a water leakage detection system using the sensor unit 100 and the information processing device 200 according to the present invention. In this case, the sensor unit 100 detects vibration from the water piping, and transmits each signal indicating the vibration acceleration of the vibration to the information processing device 200. The information processing device 200 calculates vibration acceleration in each direction based on first and second signals indicating vibrations detected by the sensor unit 100. Then, based on the vibration acceleration in each direction calculated by the information processing device 200, it is determined whether the vibration generated in the water piping is due to water leakage or not.

In the sequential diagram used in the above description, a plurality of steps (processes) is described in order. However, the execution order of the steps to be executed in each exemplary embodiment is not limited to the described order. In each exemplary embodiment, the order of the illustrated steps can be changed within the scope of not changing any contents. The exemplary embodiments can be combined within the scope of not being contradictory to one another in content.

Examples of reference modes for supplemental notes are described as follows:

1. A sensor device including:
   a first sensor group in which a plurality of first vibration sensors for detecting vibration acceleration in one direction with respect to an object to be detected are arranged to face the same direction;
   a phase difference calculation unit which, based on a plurality of first signals indicating the vibration acceleration detected by each of the plurality of first vibration sensors included in the first sensor group, calculates a first phase difference indicating a phase difference between the plurality of first signals; and
   an acceleration calculation unit which, using the first phase difference and the plurality of first signals, calculates vibration acceleration in a first direction perpendicular to a surface on which the plurality of first vibration sensors are arranged, and vibration acceleration in a second direction parallel to the surface.

2. The sensor device according to 1, wherein:
   the first direction is a direction perpendicular to a propagating direction of vibration generated in the object to be detected; and
   the second direction is a direction parallel to the propagating direction.

3. The sensor device according to 1 or 2, further including a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction, wherein:
   the phase difference calculation unit further calculates, based on a plurality of second signals indicating the vibration acceleration detected by each of the plurality of second vibration sensors included in the second sensor group, a second phase difference indicating a phase difference between the plurality of second signals; and
   the acceleration calculation unit further calculates, based on the second phase difference and the plurality of second signals, vibration acceleration in a third direction different from the first and second directions.

4. The sensor device according to 3, wherein when the surface is seen from the perpendicular direction, the direction in which the plurality of first vibration sensors are arranged and the direction in which the second vibration sensors are arranged are orthogonal to each other.

5. The sensor device according to any one of 1 to 4, wherein the vibration sensor is a piezoelectric vibration sensor.

6. The sensor device according to any one of 1 to 5, wherein the object to be detected is water piping.

7. A vibration detection system including:
   a sensor unit including a first sensor group in which a plurality of first vibration sensors for detecting vibration acceleration in one direction with respect to an object to be detected are arranged to face the same direction; and
   an information processing device, wherein:
   the sensor unit includes a transmission unit which transmits a plurality of first signals indicating the vibration acceleration detected by each of the plurality of first vibration sensors included in the first sensor group; and
   the information processing device includes:
   a reception unit which receives the plurality of first signals;
   a phase difference calculation unit which, based on the plurality of first signals, calculates a first phase difference indicating a phase difference between the plurality of first signals; and
   an acceleration calculation unit which, using the first phase difference and the plurality of first signals, calculates vibration acceleration in a first direction perpendicular to a surface on which the plurality of first vibration sensors are arranged, and vibration acceleration in a second direction parallel to the surface.

8. The vibration detection system according to 7, wherein:
   the first direction is a direction perpendicular to a propagating direction of vibration generated in the object to be detected; and
   the second direction is a direction parallel to the propagating direction.

9. The vibration detection system according to 7 or 8, wherein:
   the sensor unit further includes a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction;
   the transmission unit further transmits a plurality of second signals indicating the vibration acceleration detected by each of the plurality of second vibration sensors included in the second sensor group;
   the reception unit further receives the plurality of second signals;
   the phase difference calculation unit further calculates, based on the plurality of second signals, a second phase difference indicating a phase difference between the plurality of second signals; and
   the acceleration calculation unit further calculates, based on the second phase difference and the plurality of second signals, vibration acceleration in a third direction different from the first and second directions.

10. The vibration detection system according to 9, wherein when the surface is seen from the perpendicular direction, the direction in which the plurality of first vibration sensors are arranged and the direction in which the second vibration sensors are arranged are orthogonal to each other.

11. The vibration detection system according to any one of 7 to 10, wherein the vibration sensor is a piezoelectric vibration sensor.

12. The vibration detection system according to any one of 7 to 11, wherein the object to be detected is water piping.

13. A sensor unit including:
a first sensor group in which a plurality of first vibration sensors for detecting vibration acceleration in one direction with respect to an object to be detected are arranged to face the same direction; and
a transmission unit which transmits a plurality of first signals indicating the vibration acceleration detected by each of the plurality of first vibration sensors included in the first sensor group to the outside.

14. The sensor unit according to 13, further including
a second sensor group in which a plurality of second vibration sensors for detecting vibration acceleration in one direction with respect to the object to be detected are arranged side by side in a direction different from that in which the plurality of first vibration sensors are arranged when a surface on which the plurality of first vibration sensors are arranged is seen from a perpendicular direction,
wherein the transmission unit further transmits a plurality of second signals indicating the vibration acceleration detected by each of the plurality of second vibration sensors included in the second sensor group.

15. The sensor unit according to 14, wherein when the surface is seen from the perpendicular direction, the direction in which the plurality of first vibration sensors are arranged and the direction in which the second vibration sensors are arranged are orthogonal to each other.

16. The sensor unit according to any one of 13 to 15, wherein the vibration sensor is a piezoelectric vibration sensor.

17. The sensor unit according to any one of 13 to 16, wherein the object to be detected is water piping.

18. An information processing device which communicates with a sensor unit including a first sensor group in which a plurality of first vibration sensors for detecting vibration acceleration in one direction with respect to an object to be detected are arranged to face the same direction,
the information processing device including:
a reception unit which receives a plurality of first signals indicating the vibration acceleration detected by each of the plurality of first vibration sensors included in the first sensor group;
a phase difference calculation unit which, based on the plurality of first signals, calculates a first phase difference indicating a phase difference between the plurality of first signals; and
an acceleration calculation unit which, using the first phase difference and the plurality of first signals, calculates vibration acceleration in a first direction perpendicular to a surface on which the plurality of first vibration sensors are arranged, and vibration acceleration in a second direction parallel to the surface.

19. The information processing device according to 18, wherein:
the sensor unit further includes a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction;
the reception unit further receives a plurality of second signals indicating the vibration acceleration detected by each of the plurality of second vibration sensors included in the second sensor group;
the phase difference calculation unit further calculates, based on the plurality of second signals, a second phase difference indicating a phase difference between the plurality of second signals; and
the acceleration calculation unit further calculates, based on the second phase difference and the plurality of second signals, vibration acceleration in a third direction different from the first and second directions.

20. A vibration detection method including:
by a sensor device including a first sensor group in which a plurality of first vibration sensors for detecting vibration acceleration in one direction with respect to an object to be detected are arranged to face the same direction,
calculating, based on a plurality of first signals indicating the vibration acceleration detected by each of the plurality of first vibration sensors included in the first sensor group, a first phase difference indicating a phase difference between the plurality of first signals; and
calculating, using the first phase difference and the plurality of first signals, vibration acceleration in a first direction perpendicular to a surface on which the plurality of first vibration sensors are arranged, and vibration acceleration in a second direction parallel to the surface.

21. The vibration detection method according to 20, wherein:
the first direction is a direction perpendicular to a propagating direction of vibration generated in the object to be detected; and
the second direction is a direction parallel to the propagating direction.

22. The vibration detection method according to 20 or 21,
the sensor device further including a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction,
the method further including:
further calculating, by the sensor device, a second phase difference indicating a phase difference between a plurality of second signals based on the plurality of second signals indicating the vibration acceleration detected by each of the plurality of second vibration sensors included in the second sensor group; and
further calculating, by the acceleration calculation unit, vibration acceleration in a third direction different from the first and second directions based on the second phase difference and the plurality of second signals.

23. The vibration detection method according to 22, wherein when the surface is seen from the perpendicular direction, the direction in which the plurality of first vibration sensors are arranged and the direction in which the second vibration sensors are arranged are orthogonal to each other.

24. The vibration detection method according to any one of 20 to 23, wherein the vibration sensor is a piezoelectric vibration sensor.

25. The vibration detection method according to any one of 20 to 24, wherein the object to be detected is water piping.

26. A vibration detection method achieved by a sensor unit including a first sensor group in which a plurality of first vibration sensors for detecting vibration acceleration in one direction with respect to an object to be detected are arranged to face the same direction, and an information processing device, the method including:
by the sensor unit,
transmitting a plurality of first signals indicating the vibration acceleration detected by each of the plurality of first vibration sensors included in the first sensor group; and
by the information processing device,
receiving the plurality of first signals;
calculating, based on the plurality of first signals, a first phase difference indicating a phase difference between the plurality of first signals; and
calculating, using the first phase difference and the plurality of first signals, vibration acceleration in a first direction perpendicular to a surface on which the plurality of first vibration sensors are arranged, and vibration acceleration in a second direction parallel to the surface.

27. The vibration detection method according to 26, wherein:
the first direction is a direction perpendicular to a propagating direction of vibration generated in the object to be detected; and
the second direction is a direction parallel to the propagating direction.

28. The vibration detection method according to 26 or 27,
the sensor unit further including a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction,
the method further including:
by the sensor unit,
further transmitting a plurality of second signals indicating the vibration acceleration detected by each of the plurality of second vibration sensors included in the second sensor group; and
by the information processing device,
further receiving the plurality of second signals;
further calculating, based on the plurality of second signals, a second phase difference indicating a phase difference between the plurality of second signals; and
further calculating, based on the second phase difference and the plurality of second signals, vibration acceleration in a third direction different from the first and second directions.

29. The vibration detection method according to 28, wherein when the surface is seen from the perpendicular direction, the direction in which the plurality of first vibration sensors are arranged and the direction in which the second vibration sensors are arranged are orthogonal to each other.

30. The vibration detection method according to any one of 26 to 29, wherein the vibration sensor is a piezoelectric vibration sensor.

31. The vibration detection method according to any one of 26 to 30, wherein the object to be detected is water piping.

32. A program for causing a sensor device including a first sensor group in which a plurality of first vibration sensors for detecting vibration acceleration in one direction with respect to an object to be detected are arranged to face the same direction to achieve:
a phase difference calculation function of calculating, based on a plurality of first signals indicating the vibration acceleration detected by each of the plurality of first vibration sensors included in the first sensor group, a first phase difference indicating a phase difference between the plurality of first signals; and
an acceleration calculation function of calculating, using the first phase difference and the plurality of first signals, vibration acceleration in a first direction perpendicular to a surface on which the plurality of first vibration sensors are arranged, and vibration acceleration in a second direction parallel to the surface.

33. The program according to 32,
the sensor device further including a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction,
the program further causing the sensor device to achieve:
a function of further calculating, based on a plurality of second signals indicating the vibration acceleration detected by each of the plurality of second vibration sensors included in the second sensor group, a second phase difference indicating a phase difference between the plurality of second signals; and
a function of further calculating, based on the second phase difference and the plurality of second signals, vibration acceleration in a third direction different from the first and second directions.

34. A program for operating an information processing device which communicates with a sensor unit including a first sensor group in which a plurality of first vibration sensors for detecting vibration acceleration in one direction with respect to an object to be detected are arranged to face the same direction,
the program causing the information processing device to achieve:
a reception function of receiving a plurality of first signals indicating the vibration acceleration detected by each of the plurality of first vibration sensors included in the first sensor group;
a phase difference calculation function of calculating, based on the plurality of first signals, a first phase difference indicating a phase difference between the plurality of first signals; and
an acceleration calculation function of calculating, using the first phase difference and the plurality of first signals, vibration acceleration in a first direction perpendicular to a surface on which the plurality of first vibration sensors are arranged, and vibration acceleration in a second direction parallel to the surface.

35. The program according to 34,
the sensor unit further including a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction,
the program further causing the information processing device to achieve:
a function of further receiving a plurality of second signals indicating the vibration acceleration detected by each of the plurality of second vibration sensors included in the second sensor group;
a function of further calculating, based on the plurality of second signals, a second phase difference indicating a phase difference between the plurality of second signals; and a function of further calculating, based on the second phase difference and the plurality of second signals, vibration acceleration in a third direction different from the first and second directions.

This application is based upon and claims the benefit of priority from Japanese Patent Application No. 2012-217512, filed on Sep. 28, 2012, the disclosure of which is incorporated herein in its entirety by reference.

What is claimed is:

1. A sensor device comprising:
a first sensor group in which a plurality of first vibration sensors for detecting vibration acceleration, each first vibration sensor arranged to face in a same direction with respect to an object;
a phase difference calculation unit which, based on a plurality of first signals indicating the vibration acceleration detected by each of the plurality of first vibration sensors included in the first sensor group, calculates a first phase difference indicating a phase difference between the plurality of first signals; and
an acceleration calculation unit which, using the first phase difference and the plurality of first signals, calculates vibration acceleration in a first direction perpendicular to a surface on which the plurality of first vibration sensors are arranged, and vibration acceleration in a second direction parallel to the surface.

2. The sensor device according to claim 1, wherein:
the first direction is a direction perpendicular to a propagating direction of vibration generated in the object to be detected; and
the second direction is a direction parallel to the propagating direction.

3. The sensor device according to claim 1, further comprising a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction, wherein:
the phase difference calculation unit further calculates, based on a plurality of second signals indicating the vibration acceleration detected by each of the plurality of second vibration sensors included in the second sensor group, a second phase difference indicating a phase difference between the plurality of second signals; and
the acceleration calculation unit further calculates, based on the second phase difference and the plurality of second signals, vibration acceleration in a third direction different from the first and second directions.

4. The sensor device according to claim 3, wherein when the surface is seen from the perpendicular direction, the direction in which the plurality of first vibration sensors are arranged and the direction in which the second vibration sensors are arranged are orthogonal to each other.

5. The sensor device according to claim 1, wherein the vibration sensor is a piezoelectric vibration sensor.

6. The sensor device according to claim 1, wherein the object to be detected is water piping.

7. A vibration detection system comprising:
a sensor unit including the sensor device according to claim 1; and
an information processing device, wherein:
the sensor unit includes a transmission unit which transmits the plurality of first signals indicating the vibration acceleration detected by each of the plurality of first vibration sensors included in the first sensor group; and
the information processing device includes:
a reception unit which receives the plurality of first signals;
a phase difference calculation unit which, based on the plurality of first signals, calculates the first phase difference indicating the phase difference between the plurality of first signals; and
an acceleration calculation unit which, using the first phase difference and the plurality of first signals, calculates vibration acceleration in the first direction perpendicular to the surface on which the plurality of first vibration sensors are arranged, and vibration acceleration in the second direction parallel to the surface.

8. A vibration detection method including:
by a sensor device including a first sensor group in which a plurality of first vibration sensors for detecting vibration acceleration, each first vibration sensor arranged to face in a same direction with respect to an object,
calculating, based on a plurality of first signals indicating the vibration acceleration detected by each of the plurality of first vibration sensors included in the first sensor group, a first phase difference indicating a phase difference between the plurality of first signals; and
calculating, using the first phase difference and the plurality of first signals, vibration acceleration in a first direction perpendicular to a surface on which the plurality of first vibration sensors are arranged, and vibration acceleration in a second direction parallel to the surface.

9. The vibration detection method according to claim 8, wherein:
the first direction is a direction perpendicular to a propagating direction of vibration generated in the object to be detected; and
the second direction is a direction parallel to the propagating direction.

10. The vibration detection method according to claim 8, the sensor device further including a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction,
the method further including:
further calculating, by the sensor device, a second phase difference indicating a phase difference between a plurality of second signals based on the plurality of second signals indicating the vibration acceleration detected by each of the plurality of second vibration sensors included in the second sensor group; and
further calculating, by the acceleration calculation unit, vibration acceleration in a third direction different from the first and second directions based on the second phase difference and the plurality of second signals.

11. The vibration detection method according to claim 10, wherein when the surface is seen from the perpendicular direction, the direction in which the plurality of first vibration sensors are arranged and the direction in which the second vibration sensors are arranged are orthogonal to each other.

12. The vibration detection method according to claim 8, wherein the vibration sensor is a piezoelectric vibration sensor.

13. The vibration detection method according to claim 8, wherein the object to be detected is water piping.

14. A vibration detection method achieved by a sensor unit including the sensor device according to claim 8, and an information processing device, the method including:

by the sensor unit, transmitting a plurality of first signals indicating the vibration acceleration detected by each of the plurality of first vibration sensors included in the first sensor group; and by the information processing device, receiving the plurality of first signals;

calculating, based on the plurality of first signals, a first phase difference indicating a phase difference between the plurality of first signals; and calculating, using the first phase difference and the plurality of first signals, vibration acceleration in a first direction perpendicular to a surface on which the plurality of first vibration sensors are arranged, and vibration acceleration in a second direction parallel to the surface.

15. A non-transitory computer readable media storing program for causing a sensor device including a first sensor group in which a plurality of first vibration sensors for detecting vibration acceleration, each first vibration sensor arranged to face in a same direction with respect to an object, to achieve:

a phase difference calculation function of calculating, based on a plurality of first signals indicating the vibration acceleration detected by each of the plurality of first vibration sensors included in the first sensor group, a first phase difference indicating a phase difference between the plurality of first signals; and an acceleration calculation function of calculating, using the first phase difference and the plurality of first signals, vibration acceleration in a first direction perpendicular to a surface on which the plurality of first vibration sensors are arranged, and vibration acceleration in a second direction parallel to the surface.

16. The non-transitory computer readable media storing program according to claim 15, the sensor device further including a second sensor group in which a plurality of second vibration sensors for detecting vibration acceleration in one direction with respect to the object to be detected are arranged side by side in a direction different from that in which the plurality of first vibration sensors are arranged when the surface is seen from a perpendicular direction, the program further causing the sensor device to achieve:

a function of further calculating, based on a plurality of second signals indicating the vibration acceleration detected by each of the plurality of second vibration sensors included in the second sensor group, a second phase difference indicating a phase difference between the plurality of second signals; and a function of further calculating, based on the second phase difference and the plurality of second signals, vibration acceleration in a third direction different from the first and second directions.

\* \* \* \* \*